July 1, 1947.   J. E. LOVELY   2,423,244
POWER OPERATED CHUCK
Filed Jan. 28, 1944   2 Sheets-Sheet 2
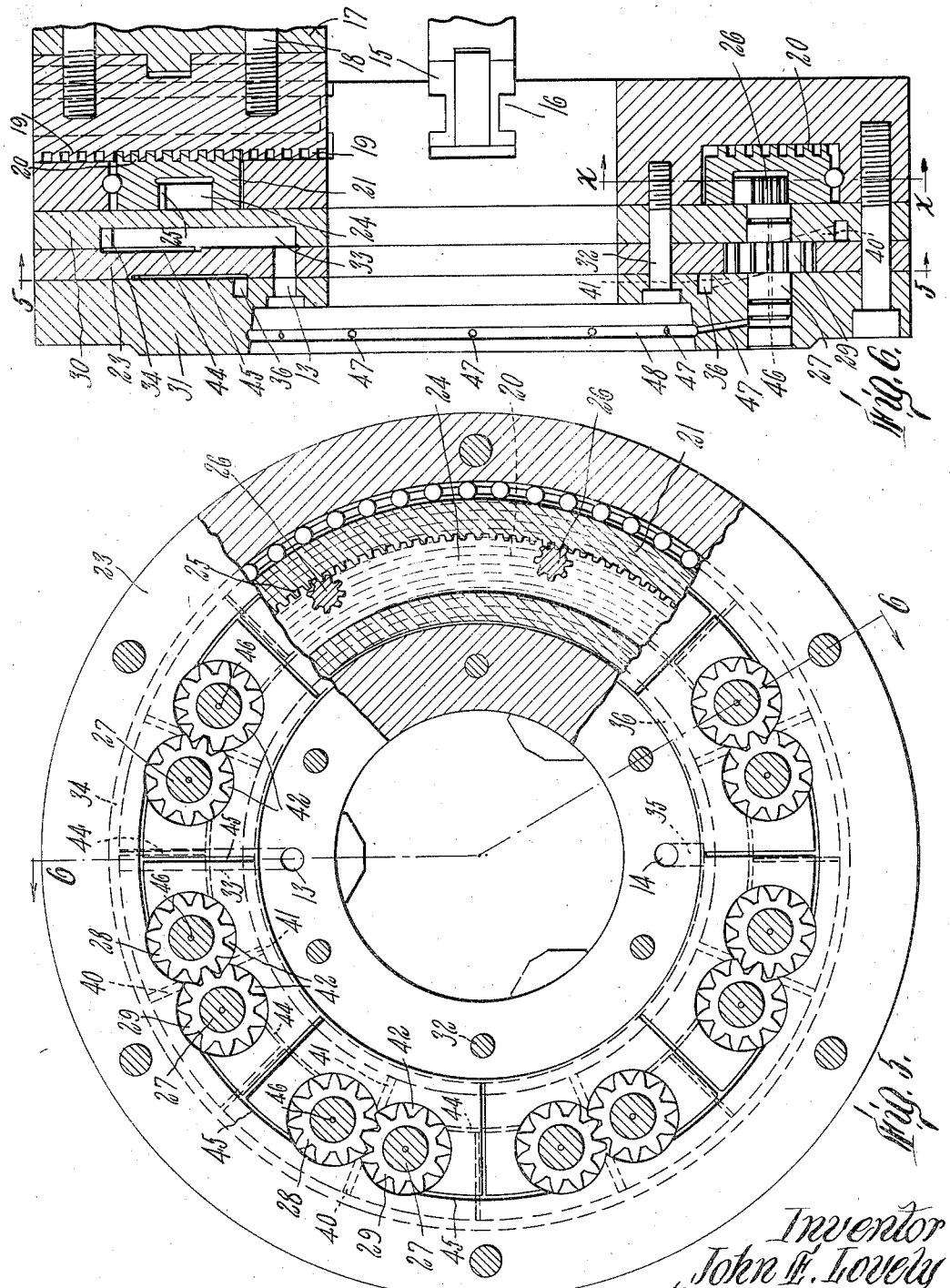

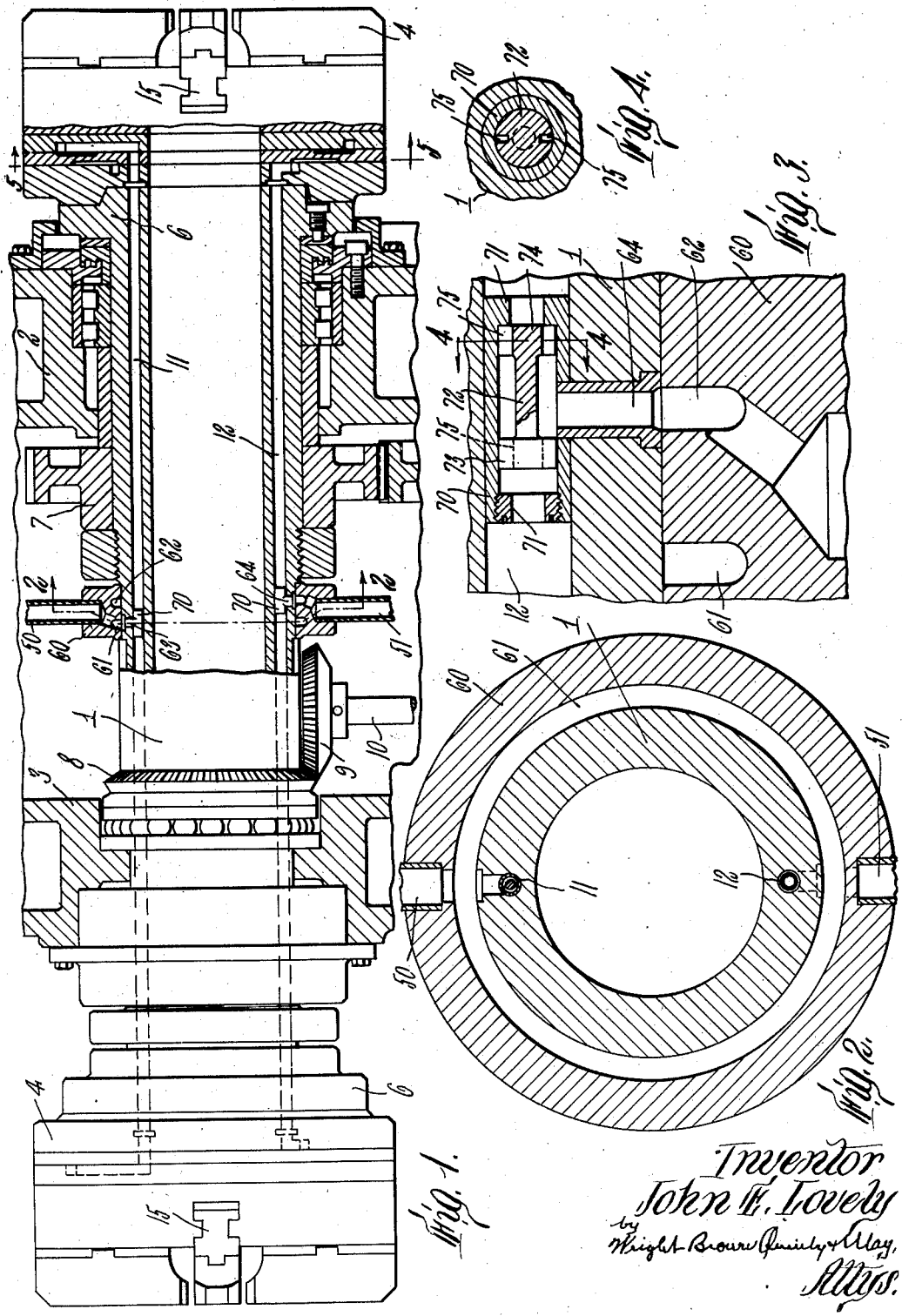

Patented July 1, 1947

2,423,244

UNITED STATES PATENT OFFICE 2,423,244

POWER-OPERATED CHUCK

John E. Lovely, Springfield, Vt., assignor to Jones & Lamson Machine Company, Springfield, Vt., a corporation of Vermont Application January 28, 1944, Serial No. 520,005

6 Claims. (Cl. 279—4)

This invention relates to power operated chucks and has for one object to provide for power application at high starting efficiency, thereby avoiding the necessity of starting the release of work through a sudden blow or shock exerted upon the work-clamping elements.

A further object is to provide a work supporting spindle having a pair of fluid pressure actuated chucks spaced therealong and provided with means by which the power applied is divided between the chucks in such a manner that substantially simultaneous actuation of both is obtained, regardless of differences of resistance to their actuation.

To attain the first-mentioned object, the actuation of each chuck is effected by the use of rotary fluid pressure motor means, preferably a plurality of such means being employed for each chuck so as to have ample power evenly distributed while keeping the chuck within small dimensions.

To attain the second-mentioned object, valve means are provided in the fluid passages to both chucks to automatically throttle the passage leading to the chuck offering the less resistance to its actuation. This valve in the fluid passage is movable by flow of the fluid to one chuck greater than that to the other to restrict the flow to that one chuck toward which it is moved by such flow.

For a more complete understanding of this invention, reference may be had to the accompanying drawings in which Figure 1 is a fragmentary view partly in side elevation and partly broken away and in section of a work-holding spindle and its mounting, the spindle having a pair of spaced fluid pressure operated chucks, this structure embodying the invention.

Figure 2 is a detail sectional view to a larger scale on line 2—2 of Figure 1.

Figure 3 is a detail sectional view to a larger scale of a portion shown in elevation in Figure 1, such portion including a flow-controlling valve.

Figure 4 is a detail sectional view on line 4—4 of Figure 3.

Figure 5 is a detail sectional view on line 5—5 of Figures 1 and 6, but partly broken away to show a section on the plane of line x—x of Figure 6.

Figure 6 is a detail sectional view on line 6—6 of Figure 5.

Referring first to Figure 1, at 1 is indicated a work spindle journaled in a pair of spaced frame members 2 and 3. This spindle supports a pair of work-holding chucks 4 spaced axially thereof. As shown each chuck is arranged at one end of the spindle, the spindle having at each end a nose 6, shown as a standard spindle nose, for receiving and having attached thereto one of the chucks. The mounting of the spindle for rotation is shown as of conventional type and it is arranged to be rotated by the rotation of a gear ring 7 secured to the spindle adjacent to the inner face of the frame member 2. At 8 is shown a bevel gear ring also secured to the spindle with which meshes a bevel gear 9 carried by a shaft 10, this being for a purpose not material to this invention. The spindle is provided with a pair of longitudinally extending fluid pressure passages 11 and 12 shown as diametrically opposite to each other. These passages open out at the ends of the spindle and lead to mating passages 13 and 14, respectively, in each of the chucks. The chucks as shown are of the scroll type having work-clamping jaw-carrying slides 15 movable radially in ways 16 in their outer faces. Work clamping jaws 17 of any suitable description are secured to the slides 15 as by screws 18. For the purpose of moving the slides 15 from and toward the axis of the spindle, the back faces of these slides are provided with rack teeth 19 which engage the mating teeth 20 of a scroll plate 21 of conventional construction and mounted for rotation coaxial with the chuck. The rear face of this scroll plate is provided with an annular recess 24 provided with internal gear teeth 25, and meshing with these teeth are pinions 26, each of these pinions being on one of the shafts 27 of a rotary fluid motor having intermeshing gears 28 and 29. A plurality of these motors are arranged in circular series about the chuck axis. These gears are located within housing openings cut in a circular plate 23 forming one axial portion of each chuck, this plate 23 being positioned between a pair of plates 30 and 31 forming end walls for the gear housing and in which the gear shafts 27 are journaled, the three plates being secured together in face to face relation as by bolts 32. One of the fluid pressure passages within the chuck, such as 13, leads into a radial passage 33 terminating in an annular passage 34 facing the ring 28 outwardly of the sets of gears 28 and 29. The passage 14 leads through a radial passage 35 in the outer face of the plate 31 into an annular passage 36 on its outer face inwardly of the sets of gears 28 and 29. From the annular passages 34 and 36 communicate face grooves 40 and 41, which communicate with the recesses 42 of the plate 23 within which the gears are housed and on opposite sides of their mating portions, thus forming the supply and discharge passages for these rotary motors which comprise the intermeshing gears. Thus as fluid under pressure is applied selectively to either of the passages 11 or 12 and the other open to discharge, as through the pipes 50 and 51, the pipe 50 leading to the passage 61 and the pipe 51 to the passage 62, the rotary motors comprising the intermeshing gears are rotated in the corresponding direction which, due to their engagement with the scroll plate, rotate the scroll plate in one or the other direction, either closing or opening the work-engaging jaws.

In order to overcome unbalance of pressure on the gears by reason of the application of fluid pressure on one side thereof, additional passages 44 and 45 comprising radial and annular face grooves in the plates 30 and 31 leading from the annular passages 34 and 36 to points diametrically opposite to the inner ends of the passages 40 and 41 have been provided, thus to equalize this pressure. The passages 44 and 45 do not provide for flow, but merely for an application of pressure to balance the pressure applied at the inlets of the motors. Leakage past the gears passes into lubricant grooves 46 in the gears shafts 27 (see Figure 6) and thence through axial grooves 47 to an annular groove 48 and back into the head stock. A particular advantage of the use of these rotary fluid pressure motors is that they have powerful starting torques, and by using a plurality of such motors, eight being shown, sufficient power is always at hand to release the work without requiring the application of sudden shock in releasing direction to the work-engaging jaws, but at the same time the individual motor units are so small that they can be inserted within the outlines of a chuck of convenient size.

Since the spindle is rotated, it is necessary that means be provided for introducing and withdrawing the actuating fluid with respect to the passages 11 and 12 without interference from such rotation. To this end, the spindle is journaled in a stationary sleeve 60 (Figure 1) provided on its inner face with a pair of annular recesses 61 and 62. One of the passages 11 communicates with the exterior of the spindle through a port 63 with the annular passage 61, while the other passage 12 communicates through a portion 64 axially spaced from the port 63 in position to open into the recess 62, the recesses 61 and 62 being open on the inner face of the sleeve throughout their entire circumferences.

It will be evident that should one of the chucks tend to open or close more freely than the other, if means were not taken to prevent such action, the flow of fluid with relation to this chuck would be relatively fast and the other chuck would not have sufficient force applied thereto to be operated until the chuck operating the easier had completed its open or closing motion. In order that the action of both may be substantially simultaneous regardless of inequalities in ease of actuation in any particular case, means may be provided for restricting the passage of fluid in that direction in which it would tend to be greater. Such means is shown best in Figure 4 and is located within each of the passages 11 and 12 adjacent to the ports 63 and 64. Figure 3 shows the structure leading from the port 64. It comprises a tubular casing 70 having reduced diameter internal heads or stops 71 at opposite ends and within which rides a spool valve 72. The heads 73 and 74 of this valve are each provided with one or more ports 75 therethrough. The port 64 opens into the casing 70 between the heads of this valve. Should the flow tend to be greater in one direction than in the other, the valve 72 is immediately moved thereby in the direction of such greater flow until its head 73 or 74 contacts with the corresponding head 71, which partly closes the ports 75, thus restricting flow in that direction, though not entirely preventing it, so that increased pressure builds up, tending to cause flow of fluid in the opposite direction toward that chuck which imposes the greater resistance to operation, thus tending to equalize the flow of fluid to the two chucks.

From the foregoing description of an embodiment of this invention, it should be evident to those skilled in the art that various changes and modifications might be made without departing from the spirit or scope of this invention.

I claim:

1. In combination, a hollow work spindle, a pair of chucks spaced axially of said hollow work spindle, fluid pressure actuating means for each chuck, fluid pressure conduits common to both actuating means, a valve element in at least one of said conduits and free to be moved by fluid pressure therein and having a pair of spaced heads between which fluid may enter or leave its respective conduit, stops limiting the extent of motion of said element in opposite directions, said heads having ports therethrough partly restricted by the adjacent stop when such element approaches said stop to thereby limit the flow of fluid in the direction of motion of said element toward said restricting stop while permitting free flow of fluid in the opposite direction.

2. In combination with a rotary work spindle, a chuck carried at one end of said spindle to rotate therewith, a plurality of work-gripping jaws carried by said chuck, means movable to adjust said jaws toward and from the axis of said spindle, a plurality of fluid pressure motors of the rotary type carried by said chuck and operatively related to said moving means, said work spindle having a fluid passage extending lengthwise thereof and connected at one end to said motors, a stationary sleeve surrounding said spindle and provided with an annular recess open on its inner face to said spindle, said spindle having a port from said passage leading to said recess, and a stationary fluid conduit leading to said recess.

3. In combination with a rotary work spindle, of a chuck carried at one end of said spindle to rotate therewith, a plurality of work-gripping jaws carried by said chuck, means movable to adjust said jaws toward and from the axis of said spindle, a plurality of fluid pressure motors of the rotary type carried by said chuck and operatively related to said moving means, said work spindle having a pair of fluid pressure supply and discharge passages extending lengthwise thereof and communicating with said motors, a stationary sleeve through which said spindle is journaled, said sleeve having a pair of axially spaced annular recesses open on its inner face to said spindle, said spindle having a pair of ports each leading from one of said passages to one of said recesses, and means for selectively applying fluid under pressure to and discharging fluid from said recesses.

4. A chuck, comprising three plates secured together in face to face relation, the intermediate plate having housing openings therethrough for a plurality of pairs of intermeshing gears of rotary fluid pressure motors, said gears having shafts journaled for rotation in the others of said plates, said other plates having annular grooves in their faces facing said intermediate plate, one of said grooves being outwardly of said openings and the other of said grooves being inwardly of said openings, said other plates having passages leading from said grooves to said openings at opposite sides of the meshing portions of the gears in said openings, one of said gear shafts of each pair having a pinion, a main gear with which all of said pinions mesh, said chuck having work-engaging jaws movable to clamp or release work, operative connections between said jaws and main gear causing rotation of said main gear in one or the other direction to close or open said jaws, and means for selectively supplying and withdrawing fluid from said annular grooves.

5. A chuck, comprising three plates secured together in face to face relation, the intermediate plate having housing openings therethrough for a plurality of pairs of intermeshing gears of rotary fluid pressure motors, said gears having shafts journaled for rotation in the others of said plates, said other plates having annular grooves in their faces facing said intermediate plate, one of said grooves being outwardly of said openings and the other of said grooves being inwardly of said openings, said other plates having passages leading from said grooves to said openings at opposite sides of the meshing portions of the gears in said openings, one of said gear shafts of each pair having a pinion, a main gear with which all of said pinions mesh, said chuck having work-engaging jaws movable to clamp or release work, operative connections between said jaws and main gear causing rotation of said main gear in one or the other direction to close or open said jaws, said chuck having passages leading from said grooves to the diametrically opposite sides of said gears from said first-mentioned passages to equalize fluid pressure against said gears, and means for selectively supplying and withdrawing fluid from said annular grooves.

6. In combination, a rotary work spindle, a chuck carried by said spindle and having a plurality of work-gripping jaws, a member carried by said chuck and rotatable about the axis of said spindle and operatively connected to said jaws to cause the rotation of said member relative to said spindle to move said jaws toward or from each other depending upon the direction of such rotation, a plurality of rotary fluid pressure motors carried by said chuck and connected to rotate said member by rotation of said motors, said motors being arranged angularly spaced about said axis, a fluid pressure source external to said spindle, and means for introducing and discharging fluid from and to said source to and from said motors.

JOHN E. LOVELY.

REFERENCES CITED

The following references are of record in the file of this patent:

UNITED STATES PATENTS

| Number | Name | Date |
| --- | --- | --- |
| 1,534,572 | Cutler | Mar. 21, 1925 |
| 2,147,761 | Whitecomb | Feb. 21, 1939 |
| 1,854,618 | Grady | Mar. 19, 1932 |
| 1,239,422 | Levy | Sept. 4, 1917 |
| 1,979,367 | Cone | Nov. 6, 1934 |
| 2,016,652 | Poole | Oct. 8, 1935 |
| 2,365,095 | Miller et al. | Dec. 12, 1944 |
| 2,188,095 | Horstuff | Jan. 23, 1940 |